(12) United States Patent
Miyazaki et al.

(10) Patent No.: US 9,145,260 B2
(45) Date of Patent: Sep. 29, 2015

(54) TIRE CONVEYANCE DEVICE

(75) Inventors: Shinichi Miyazaki, Akashi (JP); Kazuo Nakayama, Akashi (JP); Takaaki Ito, Akashi (JP); Masato Kitamoto, Akashi (JP); Takefumi Miyake, Akashi (JP)

(73) Assignee: Yamato Scale Co., Ltd., Hyogo (JP)

( * ) Notice: Subject to any disclaimer, the term of this patent is extended or adjusted under 35 U.S.C. 154(b) by 0 days.

(21) Appl. No.: 14/240,921

(22) PCT Filed: Jul. 30, 2012

(86) PCT No.: PCT/JP2012/004834
§ 371 (c)(1),
(2), (4) Date: Feb. 25, 2014

(87) PCT Pub. No.: WO2013/027335
PCT Pub. Date: Feb. 28, 2013

(65) Prior Publication Data
US 2014/0231221 A1  Aug. 21, 2014

(30) Foreign Application Priority Data
Aug. 25, 2011 (JP) ................................ 2011-183670
Apr. 17, 2012 (JP) ................................ 2012-094022

(51) Int. Cl.
*B65G 47/34* (2006.01)
*B65G 25/04* (2006.01)
*B29D 30/00* (2006.01)

(52) U.S. Cl.
CPC ............ *B65G 25/04* (2013.01); *B29D 30/0016* (2013.01); *B29D 2030/0027* (2013.01); *B29D 2030/0033* (2013.01)

(58) Field of Classification Search
CPC .... B65G 47/847; B65G 47/918; B65G 35/06; B65G 47/90; B65G 47/5104
USPC ......... 198/468.2, 468.9, 604, 620, 379, 470.1
See application file for complete search history.

(56) References Cited

U.S. PATENT DOCUMENTS

| | | | | |
|---|---|---|---|---|
| 3,895,716 | A * | 7/1975 | Ugo | 198/349 |
| 4,149,623 | A * | 4/1979 | Nelson | 198/470.1 |
| 4,597,489 | A * | 7/1986 | Junklewitz | 198/468.2 |
| 4,621,671 | A * | 11/1986 | Kane et al. | 157/1.1 |
| 4,836,386 | A * | 6/1989 | Smith | 198/468.1 |
| 6,362,443 | B1 * | 3/2002 | Kinoshita et al. | 209/574 |
| 2007/0135960 | A1 | 6/2007 | Shibao et al. | |

FOREIGN PATENT DOCUMENTS

| | | |
|---|---|---|
| DE | 2 334 328 | 12/1974 |
| JP | 5-31096 | 5/1993 |
| JP | 2000-329658 | 11/2000 |
| JP | 2004-174769 | 6/2004 |
| JP | 2004-306495 | 11/2004 |

* cited by examiner

*Primary Examiner* — James R Bidwell
(74) *Attorney, Agent, or Firm* — Jordan and Hamburg LLP

(57) ABSTRACT

A tire conveyance device is provided with at least two tire gripping devices spaced from each other at an interval in a front-rear direction and capable of gripping a horizontally situated tire from left and right sides of the tire in a direction orthogonal to a conveyance path along which the tire is conveyed in the front-rear direction. The front and rear tire gripping units are each provided with a pair of left and right tire support mechanisms facing each other across the conveyance path. The tire conveyance unit is also provided with a drive unit which moves the two tire gripping units together in the front-rear direction with a stroke equal to the interval between the two tire gripping devices in the front-rear direction.

7 Claims, 16 Drawing Sheets

F I G. 1 2
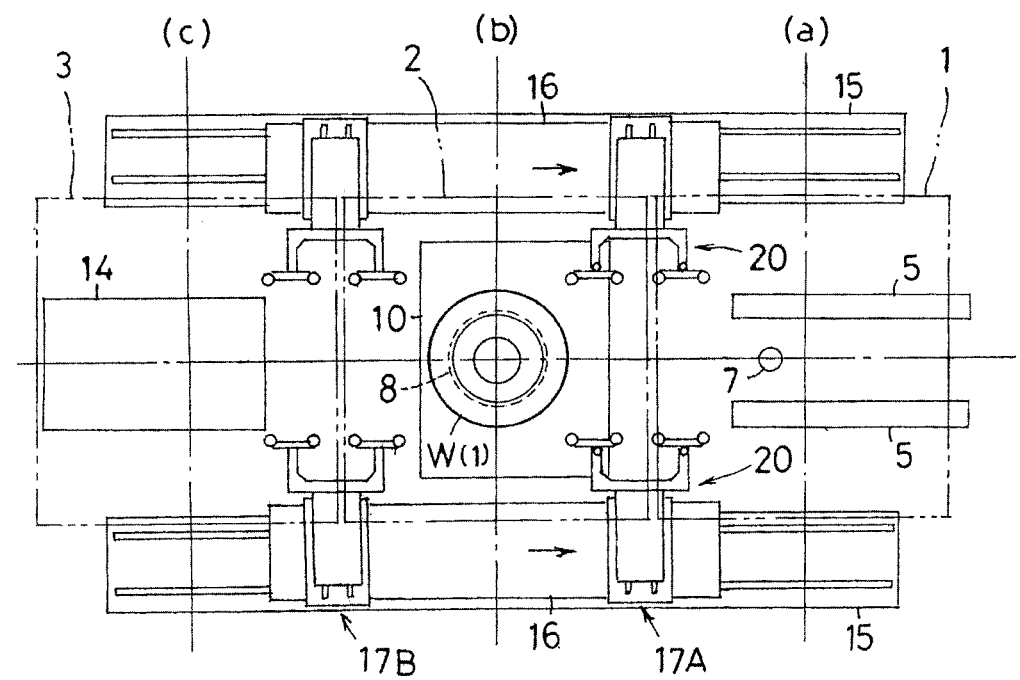
F I G. 1 3
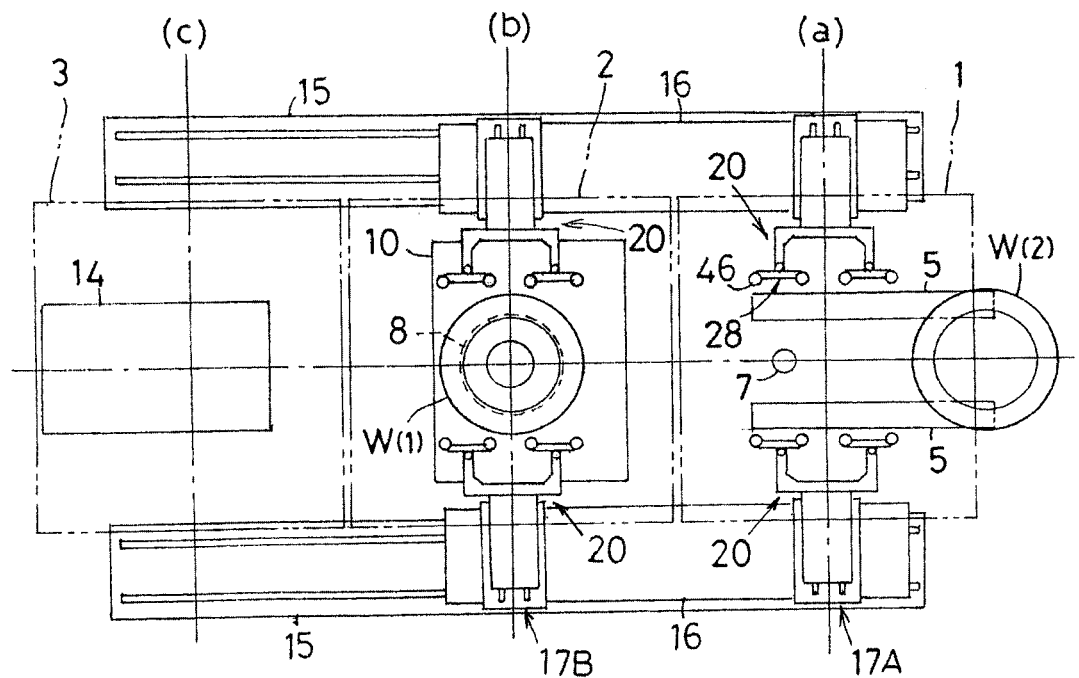

F I G. 1 9
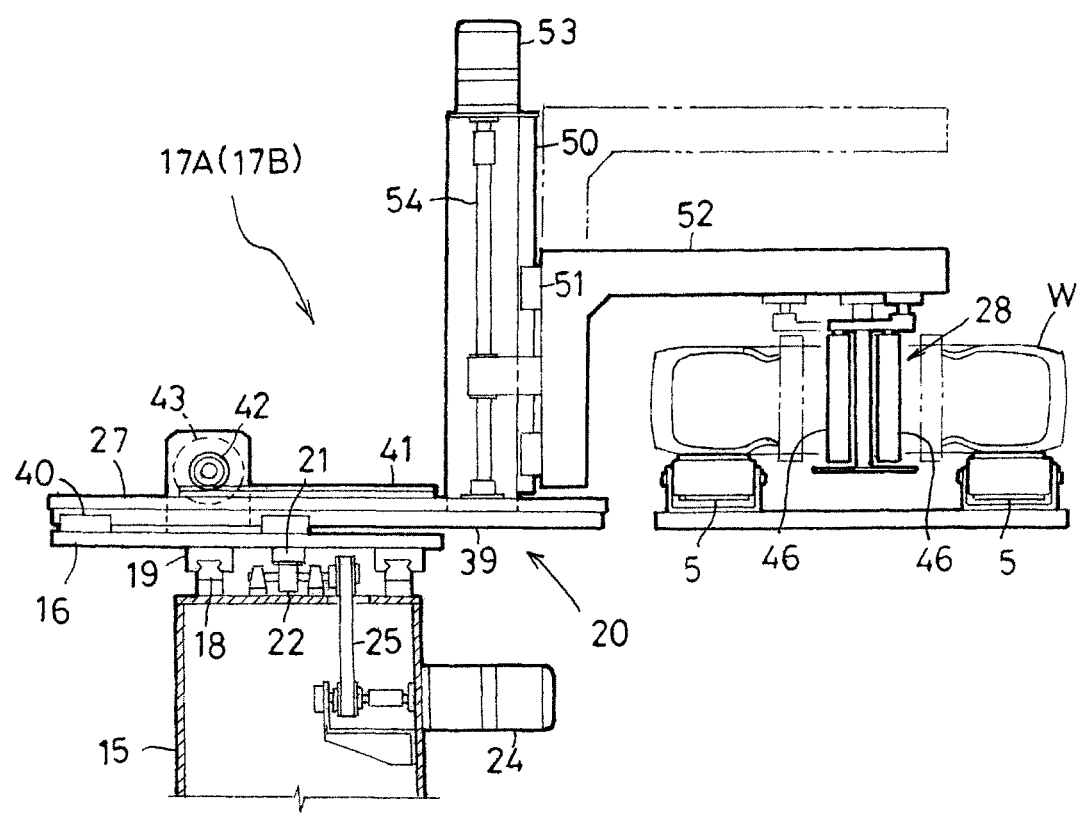

TIRE CONVEYANCE DEVICE

BACKGROUND OF THE INVENTION

The present invention relates to a tire conveyance devices used in, for example, tire production lines to convey tires.

Conventionally, roller conveyers are typically used as tire conveyance devices used in tire production lines, an example of which is disclosed in JP 2000-329658 A. The tire conveyance device disclosed in this document conveys a tire mounted on a conveyer by rotating a group of rollers.

SUMMARY OF THE INVENTION

In these conventional roller conveyers, when the rotational speed of the rollers is increased to convey a tire at higher speeds, the rollers often slip relative to the tire. In the case where such slip happens, it is likely that the conveyance speed of the tire becomes unsteady, and/or the conveyance direction of the tire is displaced. To avoid these problems, there is no choice but to convey the tire at low speeds.

In the tire testing systems conventionally used to test the dynamic balance of tires, a plurality of processing stages are provided along a tire conveyance path, and centering of the tires is a necessary step every time when the tire is conveyed to any of the processing stages. The centering needs a certain amount of time apart from an amount of time required for the tires to be conveyed by the roller conveyer.

Further, it is necessary to convey a next tire to the processing stage after a tire currently in a processing stage is conveyed to a next processing stage. Thus, it is not possible to convey the tires at once to and from the processing stage. Inevitably, there is a time delay for a tire to be conveyed to a processing stage after another tire currently in the processing stage is conveyed out.

Thus, the conventional tire conveyance devices have disadvantages; additional time for centering, and inevitable time delay in the tire conveyance. These disadvantages are obstacles in the way of reducing test time in the tire testing systems.

In the tire testing systems, when a tire, whose unbalance has been measured in a measuring stage, is conveyed to a marking stage by the roller conveyer, the tire possibly rotates, changing its circumferential position. In such an event, a measured unbalance position of the tire changes, resulting in failure to obtain a correct marking position in the marking stage.

The invention was accomplished to solve these problems. A main object of the invention is to reduce an amount of time for a tire to be conveyed. Another object of the invention is to reduce test time in tire testing systems.

The invention directed at achieving these objects provides a tire conveyance device characterized as described below.

(1) A tire conveyance device comprising: a plurality of tire gripping means for gripping a tire from an outer circumferential side or an inner circumferential side along a conveying direction of the tire; and driving means for moving the plurality of tire gripping means along the conveying direction, wherein the driving means moves the tire gripping means on an upstream side of the conveying direction and the tire gripping means on a downstream side thereof together to the downstream side of the conveying direction in a state where the tire gripping means respectively grip the tire.

According to the tire conveyance device provided by the invention, the tire gripping means each grips a tire from an outer circumferential side or in inner circumferential side of the tire, and the tire gripping means thus gripping the tires are moved in the conveyance direction. The tire conveyance device thus characterized eliminates the risk of a problem of the conventional roller conveyers; slip of rollers relative to a tire, ensuring high speeds of the tire conveyance. The tire conveyance device further eliminates the risk of unintended rotation of a tire during the conveyance, thereby avoiding displacement of the circumferential position of the tire.

The tire, when simply gripped by the tire gripping means from an outer circumferential side or an inner circumferential side of the tire, can be centered and then conveyed to a next processing stage. Therefore, centering of the tire can be omitted in the next processing stage. Because of this technical advantage as well as no risk of rotation-caused displacement described earlier, the tire can be immediately subjected to predetermined processes.

The tire gripping means on the upstream and downstream sides of the tire conveyance direction that are respectively gripping the tires are moved together to the downstream side. Thus, the tires respectively gripped by the tire gripping means on the upstream and downstream sides can be conveyed at once to the downstream side. In the device thus characterized, for example, while a tire currently in a processing stage is conveyed by the downstream tire gripping means to a next processing stage, a next tire can be conveyed at the same time by the upstream tire gripping means to the processing stage. Thus, the tires can be serially conveyed to the processing stages provided along the conveyance direction. This technical advantage further reduces processing time in tire testing systems provided with a plurality of processing stages.

(2) In the tire conveyance device according to a preferred aspect of the invention, the driving means includes a moving body for moving the tire gripping means along the conveying direction, and the moving body is moved along a moving path arranged on both sides or one side of a conveying path of the tire.

According to the preferred aspect, a moving mechanism including the moving path and the movable body for moving the tire gripping means are provided on one side or both sides of the tire conveyance path. This leaves a free space in an upper direction of the tire conveyance path. The space can be used as an area where tire processing devices are provided, for example, an elevating machine and a marking device. The elevating machine moves an upper rim upward and downward away from and toward a tire mounted on a lower rim of a measuring device to measure the dynamic balance of the tire. The marking device has a marking head movable upward and downward to imprint a dynamic balance measuring result on the tire.

(3) In the tire conveyance device according to the preferred aspect recited in 2), the moving path is a rail extending along the conveying path of the tire, and the moving body is a movable base to be moved along the rail with the tire gripping means being mounted and supported on the movable base.

According to the preferred aspect, the tire gripping means are mounted on and supported by the movable table that moves along the rail provided on one side or both sides of the tire conveyance path, and then moved in the tire conveyance direction. This leaves a free space in an upper direction of the tire conveyance path. In the presence of such a space, upward and downward movements of a marking device for moving a marking head and an elevating machine for moving an upper rim are not disturbed.

(4) In the tire conveyance device according to another preferred aspect of the invention, the tire gripping means grip the tire in a horizontal posture by nipping the tire from both sides on the outer circumference thereof, and the driving means moves the tire gripping means on the upstream side of the conveying direction and the tire gripping means on the downstream side thereof along the conveying direction at the same time.

According to the preferred aspect, the tire gripping means, when griping the tire horizontally situated by sandwiching the tire from both outer circumferential sides thereof, succeeds in centering of the tire as well. Further, the driving means moves the tire gripping means on the upstream and downstream sides of the conveyance direction at the same time along the conveyance direction. In the tire conveyance device thus characterized, while a tire currently in a processing stage is conveyed by the downstream tire gripping means to a next processing stage, a next tire can be conveyed at the same time by the upstream tire gripping means to the processing stage.

(5) In the tire conveyance device according to yet another preferred aspect of the invention, the tire gripping means grip the tire in a horizontal posture by extending the tire from the inner circumferential side thereof, and the driving means moves the tire gripping means on the upstream side of the conveying direction and the tire gripping means on the downstream side thereof along the conveying direction at the same time.

According to the preferred aspect, the tire gripping means, when gripping the tire horizontally situated in a manner that the inner circumference of the tire is enlarged is enlarged succeeds in centering of the tire as well. Further, the driving means moves the tire gripping means on the upstream and downstream sides of the conveyance direction at the same time along the conveyance direction. In the device thus characterized, while a tire currently in a processing stage is conveyed by the downstream tire gripping means to a next processing stage, a next tire can be conveyed at the same time by the upstream tire gripping means to the processing stage.

(6) In the tire conveyance device according to the preferred aspect recited in 4), the tire gripping means have facing tire gripping portions, and the tire gripping portions are movable close to or away from each other and elevatable, and are capable of gripping the tire by being moved close to each other and nipping the tire from both sides.

According to the preferred aspect, the tire gripping portions facing each other oscillate toward each other and grip the tire in a manner that the tire is sandwiched from both sides of the tire. As a result, the tire can be easily and surely positionally adjusted to the center of the tire gripping portions. Thus, centering of the tire succeeds.

The tire gripping portions are movable upward and downward. When the tire gripping portions gripping the tire therebetween are moved upward, the tire on a roller conveyer can be lifted upward from the conveyer and then conveyed. This ensures high speeds in the tire conveyance.

(7) In the tire conveyance device according to the preferred aspect recited in 4), the tire gripping means have tire gripping portions horizontally oscillatable in the direction in which the tire gripping portions come close to or away from each other, and the tire gripping portions are elevatable, and are capable of gripping the tire by being oscillated in the direction in which the tire gripping portions come close to each other and nipping the tire from both sides.

According to the preferred aspect, when the tire gripping portions are oscillated toward each other to grip the tire in a manner that the tire is sandwiched from both sides of the tire, the tire can be positionally adjusted to the center of the tire gripping portions (centering).

The tire gripping portions are movable upward and downward. When the tire gripping portions gripping the tire therebetween are moved upward, the tire on a roller conveyer can be lifted perfectly upward from the conveyer and then conveyed. This ensures high speeds in the tire conveyance.

(8) In the tire conveyance device according to the preferred aspect recited in 5), the tire gripping means have elevatable tire gripping portions to be inserted into and drawn from a hole of the tire from the upper side, and the tire gripping portions have a plurality of support bodies movable inward and outward, and are capable of gripping the tire by inserting the plurality of support bodies into the hole of the tire, moving the support bodies outward, and extending the tire from the inner circumferential side.

According to the preferred aspect, when the support members are inserted in the hole of the tire and moved outward, the tire can be supported from its inner circumferential side and positionally adjusted to the center of the tire gripping portions (centering).

The tire gripping portions are movable upward and downward. When the tire gripping portions gripping the tire therebetween are moved upward, the tire on a roller conveyer can be lifted perfectly upward from the conveyer and then conveyed. This ensures high speeds in the tire conveyance.

(9) The tire conveyance device according to yet another preferred aspect of the invention includes two tire gripping means are provided along the conveying direction, in the conveying path of the tire, a carry-in stage in which the tire is carried in, a measurement stage in which dynamic balance of the tire is measured, and a marking stage in which the tire is marked are arranged at equal intervals along the conveying direction, and the driving means moves both the two tire gripping means along the conveying direction with the same strokes as the equal intervals.

According to the preferred aspect, two tire gripping means can be moved together in the conveyance direction with a stroke corresponding to the interval between the equally spaced stages. For example, while a tire already processed in the carry-in stage is centered and conveyed to the measuring stage by one of the tire gripping means, a tire already measured in the measuring stage is centered and conveyed at the same time to the marking stage by the other tire gripping means. The device according to the preferred aspect is characterized in that a tire is centered and then conveyed very fast to and from different processing stages. The device, when used in tire testing systems with such different processing stages, succeeds in reduction of test time.

According to the invention wherein the tire is held from both sides thereof and then conveyed, the tire can be sliplessly conveyed at high speeds, and the risk of any rotation-caused displacement of the tire during the conveyance is avoided. The tire, when simply gripped by the tire gripping means, can be centered as well. This saves time conventionally required for centering in each of different processing stage every time when tires are serially conveyed to these processing stages. Further, the plural gripping means are moved at once so that the tires are conveyed at the time to and from the processing stages. This reduces overall processing time of the system.

BRIEF DESCRIPTION OF THE DRAWINGS

FIG. 12 is a plan view illustrating the tire conveying operation.

FIG. 13 is a plan view illustrating the tire conveying operation.

FIG. 19 is a front view of the tire conveyance device according to the embodiment of FIG. 18.

DETAILED DESCRIPTION OF THE INVENTION

Hereinafter, embodiments of the invention are described in detail referring to the accompanying drawings.

Embodiment 1

Figure 1:
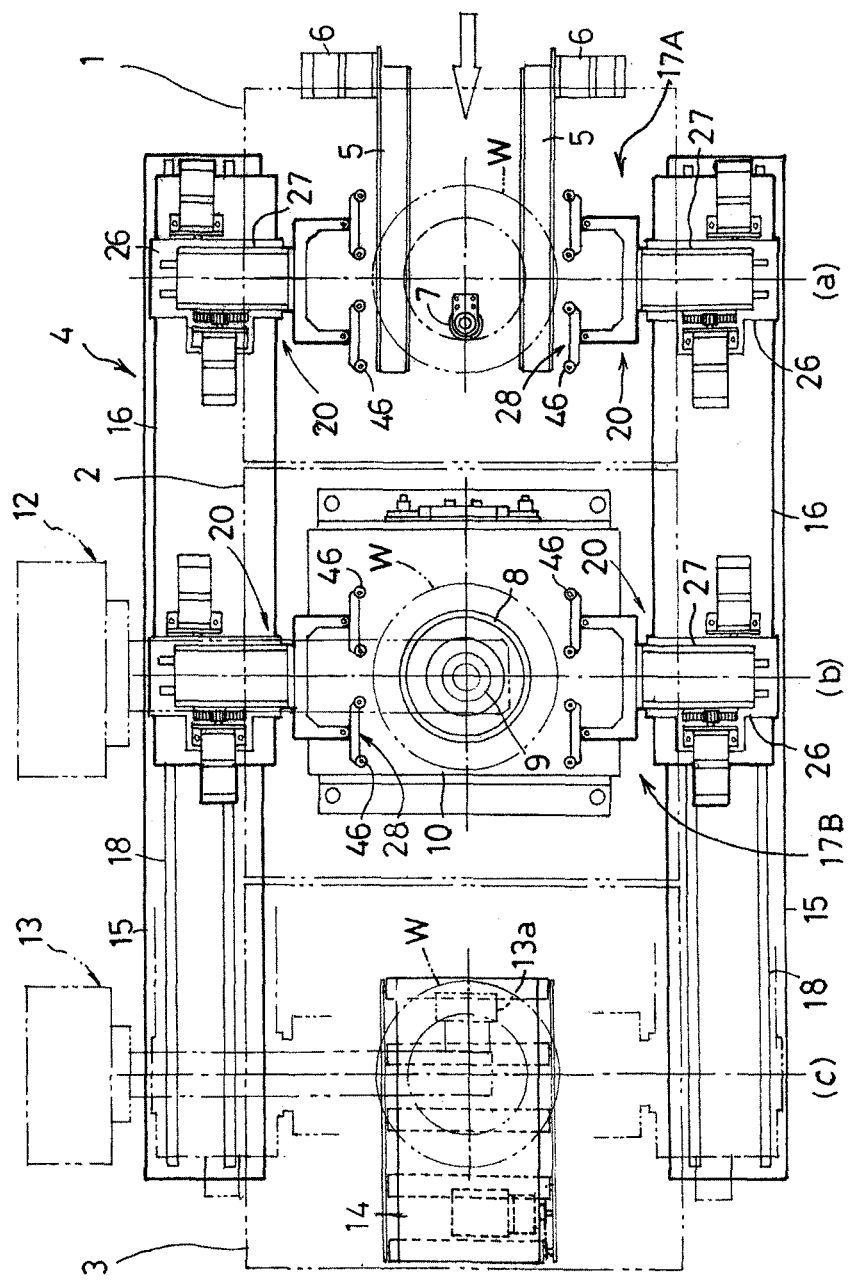
FIG. 1 is a plan view of a tire dynamic balance measuring system.

FIG. 1 is a plan view of a tire dynamic balance measuring system. The tire dynamic balance measuring system is a tire testing system provided with a tire conveyance device according to an embodiment 1 of the invention. The tire dynamic balance measuring system is configured to measure the dynamic balance of tires. In the tire dynamic balance measuring system, a carry-in stage 1, a measuring stage 2, and a marking stage 3 are tandemly disposed in this order in a direction from the front side to the rear side of the system that is a tire conveyance direction (from right to left on the drawing). The stages 1, 2, and 3 are provided with a tire conveyance device 4 that conveys a tire W serially to these stages 1, 2, and 3.

In the tire dynamic balance measuring system, an interval in the front-rear direction between a center position a of the carry-in stage 1 and a center position b of the measuring stage 2 and an interval in the front-rear direction between the center position b of the measuring stage 2 and a center position c of the marking stage 3 are set to an equal dimension.

The carry-in stage 1 has a pair of left and right carry-in belt conveyers 5. The tire W horizontally situated is placed on the carry-in conveyers 5 and conveyed to the center of the carry-in stage 1. The left and right carry-in conveyers 5 are independently driven by servo motors 6 respectively rotatable in normal and reverse directions. When the left and right carry-in conveyers 5 are synchronously driven in normal direction, the tire W on the conveyers 5 is conveyed rearward. When the left and right carry-in conveyers 5 are synchronously driven in opposite directions, the tire W placed on the conveyers 5 rotates around its own axis on the conveyers 5.

In the carry-in stage 1, when the tire W is conveyed thereto, a stripping agent, such as soap water, is applied to the inner circumference of a bead portion of the tire W by the use of an application roller 7. The bead portion of the tire W is often solidly stuck to rims and inseparable therefrom, which becomes a problem later when the tire W is removed after the dynamic balance is measured in the measuring stage 2. The stripping agent is applied to the bead portion to avoid the problem.

Figure 2:
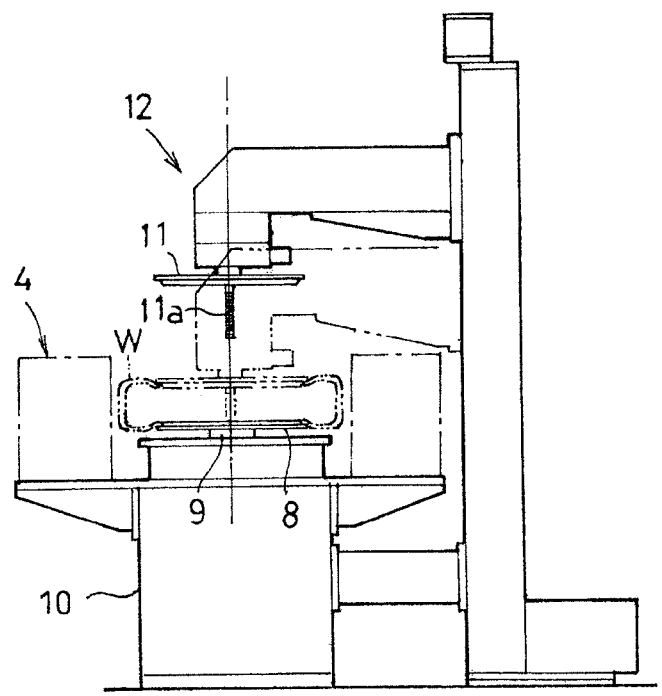
FIG. 2 is a front view of a measuring stage.

As illustrated in FIG. 2, the measuring stage 2 measures a centrifugal force horizontally generated by the unbalance of the tire W while the tire W is rotating. Based on a measuring result thereby obtained, the dynamic balance and minimum weight position of the tire W are processed and calculated. The measuring stage 2 has a measuring instrument 10 having a spindle 9 connected to and rotates a lower rim 8, and a rim elevating machine 12 that moves an upper rim 11 upward and downward on the axis of the spindle.

The measuring instrument 10 obtains processing results of, for example, an amount of unbalance and an angle of the tire W, which is described below. First, the tire W is mounted between the lower rim 8 connected to an upper end of the spindle 9 and the upper rim 11 moved downward and connected to the spindle 9. Next, a pressurized air is injected into the tire W held between the upper rim 11 and the lower rim 8 to inflate the tire W until a predetermined pressure level is reached. The inflated tire W is then rotated at a predetermined rotational speed by the spindle 9. In the case where a centrifugal force is horizontally generated in the tire W due to any unbalance of the tire W, the centrifugal force is measured by a load detector in which load cells are used. At the same time, a rotational position of the tire W is measured by a rotary encoder. Based on these measured data, the measuring instrument 10 obtains the processing results of an amount of unbalance and an angle of the tire W.

Figure 3:
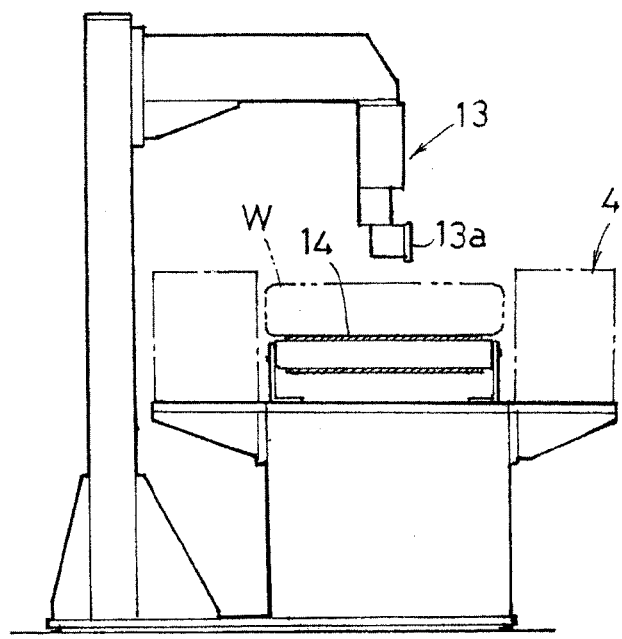
FIG. 3 is rear view of a marking stage.

As illustrated in FIG. 3, the marking stage 3 imprints, for example, minimum weight position based on the measuring result obtained in the measuring stage 2 on a side surface of the tire W. The marking stage 3 is provided with a marking device 13 having a marking head 13a movable upward and downward. The marking head 13a presses an imprinting head on a thermal transfer tape and transfers an imprinted mark to a predetermined position on the side surface of the tire. The marking stage 3 is further provided with carry-out conveyers 14 with motor-driven wide belts.

Figure 4:
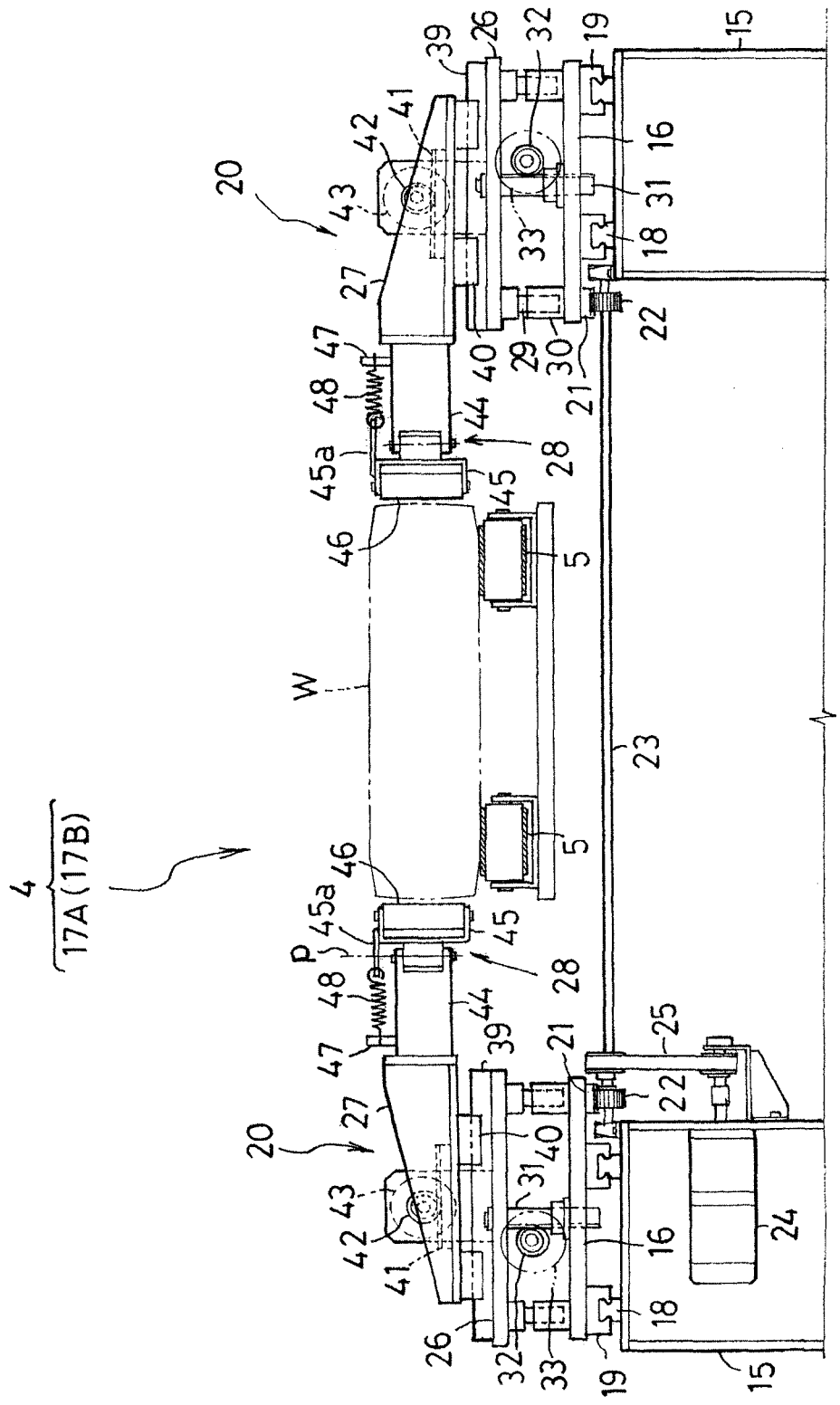
FIG. 4 is a front view of a tire conveyance device.
Figure 5:
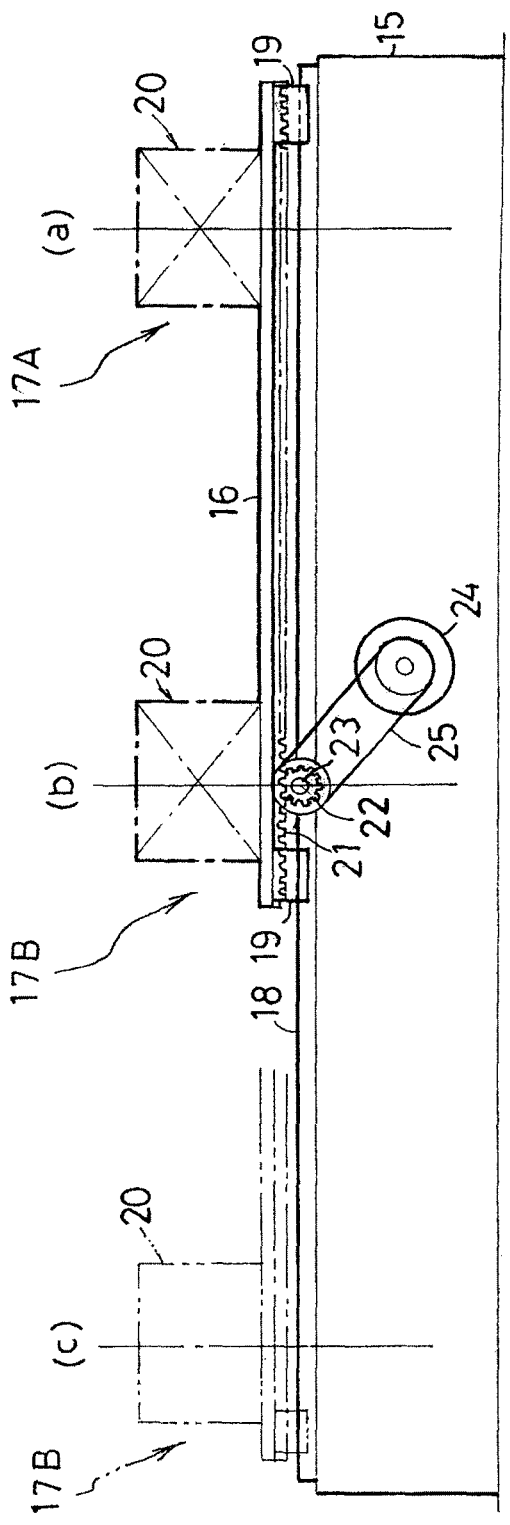
FIG. 5 is a side view schematically illustrating a drive structure for forward and rearward movements.
Figure 6:
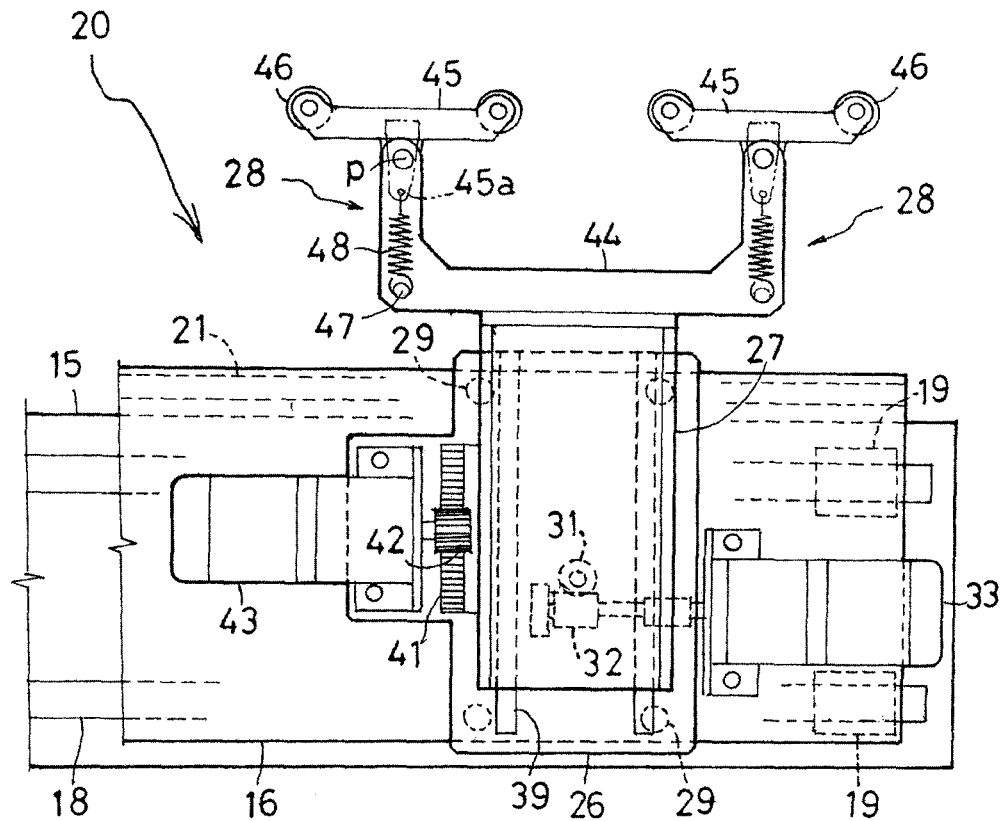
FIG. 6 is a plan view of a tire support mechanism.
Figure 7:
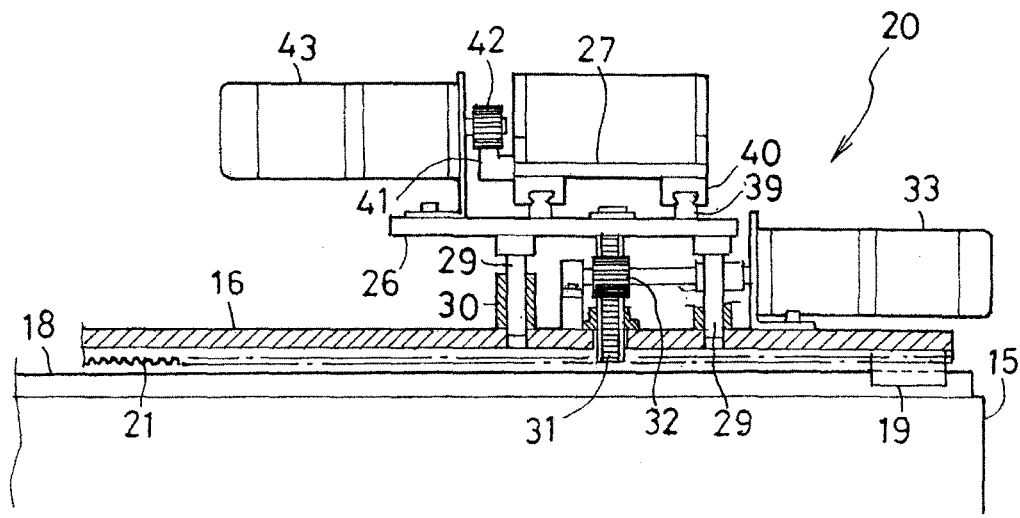
FIG. 7 is a cross sectional side view of a part of the tire support mechanism.

FIG. 4 is a front view of the tire conveyance device. FIG. 5 is a side view schematically illustrating a drive structure for forward and rearward movements. FIG. 6 is a plan view of a tire support mechanism. FIG. 7 is a cross sectional side view of a part of the tire support mechanism. Referring to FIGS. 4 to 7 and FIG. 1, structural characteristics of the tire conveyance device are hereinafter described in detail.

A tire conveyance device 4 according to the embodiment has bases 15 having an elongated shape in the front-rear direction. The bases 15 are respectively fixed to left and right sides of a conveyance path provided along the front-rear direction that is a tire conveyance direction. The tire conveyance device 4 further has front-rear movable tables 16 respectively attached to the bases 15 movably in the front-rear direction, and two tire gripping units 17A and 17B provided at front and rear two positions of the front-rear movable tables 16.

A pair of left and right rails 18, which are long rails extending in the front-rear direction, is provided on an upper surface of each of the left and right bases 15. The left and right rails 18 are in parallel to the conveyance direction. The front-rear movable tables 16 are mounted on the rails 18 via sliders 19 movably in the front-rear direction. The tire gripping units 17A and 17B provided at two positions in the front-rear direction of the front-rear movable tables 16 each has a pair of left and right tire support mechanisms 20. The tire support mechanisms 20 face each other across the conveyance path.

On lower surfaces of the front-rear movable tables 16, racks 21 are provided along the front-rear direction with their teeth turned downward, and pinion gears 21 are engaged with the respective racks 21. As illustrated in FIGS. 4 and 5, the pinion gears 22 are connected to a rotational shaft 23. The rotational shaft 23 is a long shaft extending in a left-right direction and horizontally hung between center positions of the base 15. One of the bases 15 is provided with a servo motor 24. A toothed belt 25 is wound around the servo motor 24 and the rotational shaft 23. The servo motor 24 and the rotational shaft 23 accordingly operate in an interlocking manner.

When the servo motor 24 is driven in normal or reverse direction, the left and right opinion gears 22 rotate, thereby moving the front-rear movable tables 16 in the front-rear direction. When the tables 16 are thus moved, the front and rear tire griping devices 17A and 17B synchronously move together in the front-rear direction. This is the mechanism of the drive unit according to the embodiment.

The drive unit that moves the tire gripping units 17A and 17B along the conveyance direction of the tire W is provided on both sides of and below the conveyance path of the tire W. This leaves a free space in an upper direction of the conveyance path of the tire W. In the presence of such a space, when the upper rim 11 of the measuring instrument 10 that measures the dynamic balance in the measuring stage 2 is moved upward and downward, or the marking head 13a of the marking device 13 is moved upward and downward in the marking stage 3, these upward and downward movements are not disturbed. As a result, a sequence of processes can be efficiently performed.

The tire support mechanisms 20 of the tire gripping unit 17A, 17B are each provided with an up-down table 26 supported slidably upward and downward by the front-rear movable table 16, a left-right movable table 27 supported movably leftward and rightward by the up-down table 26, and a tire gripper 28 attached to an end part of the left-right movable table 27 on the conveyance-path side.

The up-down table 26 has guide shafts 29 and a rack shaft 31. There are four guide shafts 29, which are extending downward from the up-down table 26. The guide shafts 29 are inserted in slide bosses 30 provided on the front-rear movable table 16 and thereby supported slidably upward and downward. The rack shaft 31 is extending downward from the up-down table 26. The front-rear movable table 16 is provided with a pinion gear 32 engaged with the rack shaft 31 and a servo motor 33 that rotates the pinion gear 32 in normal and reverse directions. When the servo motor 33 is rotated in normal or reverse direction, the pinion gear 32 rotates, thereby moving the up-down table 26 upward and downward. This is the mechanism of the drive unit for upward and downward movements to move the up-down table 26 upward and downward by rotation of the pinion gear 32 according to the embodiment.

The left-right movable table 27 is mounted on rails 39 provided on an upper surface of the up-down table 26 via sliders 40. The left-right movable table 27 is mounted on the rails 39 movably in the left-right direction. A rack 41 with its teeth turned upward is attached in the left-right direction to a rear part of the left-right movable table 27. The up-down table 26 has a pinion gear 42 engaged with the rack 41, and a servo motor 43 that rotates the pinion gear 42 in normal and reverse directions. When the servo motor 43 is rotated in normal or reverse direction, the pinion gear 42 rotates, thereby moving the left-right movable table 27 in the left-right direction orthogonal to the conveyance path. This is the mechanism of the drive unit for leftward and rightward movements according to the embodiment.

The tire gripper 28 has a bifurcated support arm 44. The support arm 44 is connected in the form of a horizontal cantilever to an end part of the left-right movable table 27 on the conveyance-path side. As illustrated in FIGS. 4 and 6, intermediate parts in the front-rear direction of brackets 45, which are oscillatable members, are pivotally connected to edges of the support arm 44 to allow the brackets 45 to freely oscillate around a vertical fulcrum p. In each of the brackets 45, support rollers 46 vertically situated are pivotally connected to front and rear ends on both sides thereof in a freely rotatable manner. When the left-right movable tables 27 move, therefore, four support rollers 46 of the bracket 45 move toward or away from the conveyance path. More specifically, when the left-right movable tables 27 move, the four support rollers 45 of the brackets 45 advances into the conveyance path or recede from the conveyance path.

An arm 45a is extending laterally outward from an upper surface at the center of the bracket 45. A spring receiving pin 47 is provided in a standing condition on an upper surface of a base part of the support arm 44. A spring 48 is provided in a tensioned condition from an edge of the arm 45a to the spring receiving pin 47. With no external force acting upon the support rollers 46, the brackets 45 are along the front-rear direction. More specifically, the four support rollers 46 are retained by the tensile force of the springs 48 to be aligned in a row in the front-rear direction. Two springs may be provided in a tensioned condition between the support arm 44 and front and rear two positions of each bracket 45.

So far were described the structural characteristics of the tire dynamic balance measuring system according to the embodiment.

Hereinafter, an operation performed by the system, in which the tire W is serially conveyed to the respective stages to be processed, is described referring to FIGS. 8 to 17. In the drawings and description given below, the tire W is described and illustrated with numbers indicating the order of conveyance.

Figure 8:
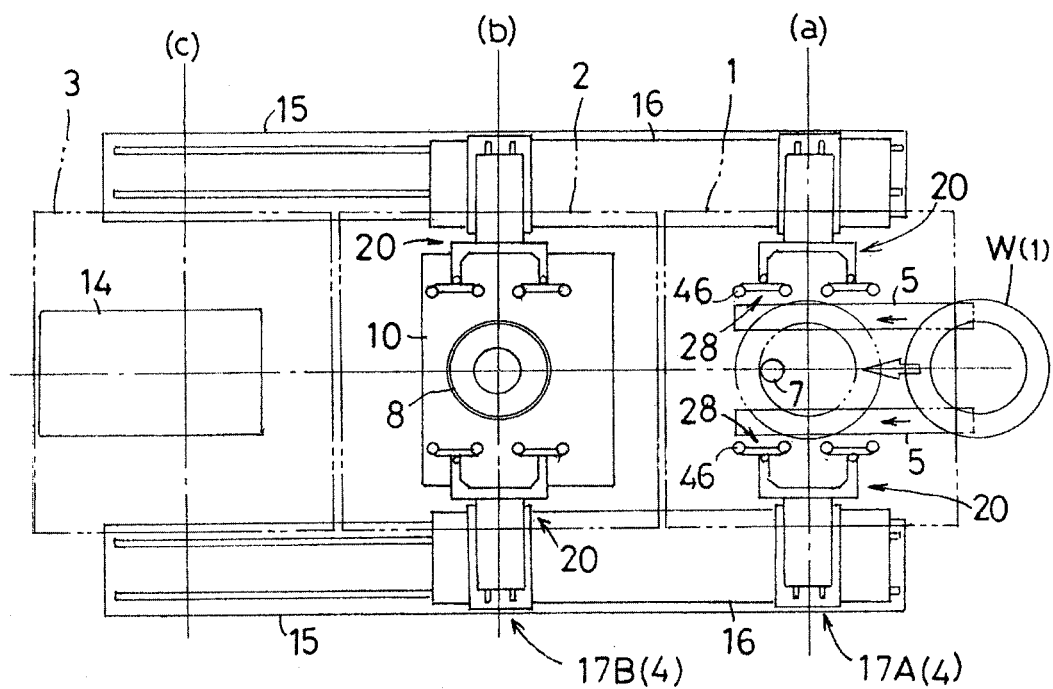
FIG. 8 is a plan view illustrating a tire conveying operation.

(1) As illustrated in FIG. 8, the tire W (1) obtained by molding is horizontally situated and conveyed from the front side of the device to the carry-in stage 1 by a conveyer not illustrated in the drawing. The tire W (1) is then transferred to and placed on the left and right carry-in conveyers 5 which are synchronously rotating in normal direction, and the tire W (1) is conveyed rearward. At the time, the application roller 7 is located at its standby position below the surfaces of the conveyers. The front-rear movable tables 16 of the tire conveyance device 4 are located at forward positions. The tire gripping unit 17A on the front side, which is the upstream side of the conveyance direction of the tire W, is located at the center position a of the carry-in stage 1. The tire gripping unit 17B on the rear side, which is the downstream side of the conveyance direction of the tire W, is located at the center position b of the measuring stage 2.

The up-down tables 26 of the tire gripping units 17A and 17B are at downward positions, the left-right movable tables 27 are at receded positions, and the left-right tire grippers 28 are at standby positions where these grippers do not disturb the movement of the tire W (1).

(2) When it is detected based on the output of a photoelectric sensor that the center hole of the tire W (1) arrives at a position above the application roller 7, the carry-in conveyers 5 are stopped, and the application roller 7 moves upward and penetrates through the center hole of the tire W (1) from therebelow.

(3) In the left and right tire support mechanisms 20 of the tire gripping unit 17A on the front side, the servo motors 43 are synchronously driven, and the left-right movable tables 27 both move toward the conveyance path, thereby approaching each other. When the left-right movable tables 27 are close enough to each other, the tire W (1) is gripped by the grippers 28. At the time, two pairs of support rollers 46 pivotally connected to the front and rear two ends of the brackets 45 are pushed against the tire W (1). Then, the brackets 45 start to oscillate, stretching the springs 48, and the tire support rollers 46 on the left and right sides, four on each side, are further pushed against the tire W (1).

In the case of any displacement of the tire W (1) from the center of the stage when gripped by the tire grippers 28, one or more of the eight support rollers 46 lose contact with the tire W (1). However, when the tire grippers 28 continue to be pushed until all of the eight support rollers 46 are pushed against the tire W (1), the tire W (1) thus pushed by these support rollers is positionally adjusted to the center of the stage and precisely centered.

Thus, the servo motors 43 of the left and right tire support mechanisms 20 are synchronously driven, and the tire W (1) is gripped by the left and right tire grippers 28 and centered. This enables high-precision centering. For example, in devices wherein a plurality of oscillatable arms with support rollers attached to edges thereof are provided on the left and right sides, and the oscillatable arms are oscillated by a plurality of air cylinders to push the support rollers against the tire for centering, it is difficult to synchronize the plural air cylinders. In such devices, high-precision centering is difficult to achieve. In the centered tire W (1), its inner circumference (inner circumference of the bead portion) is in contact with the application roller 7.

Figure 9:
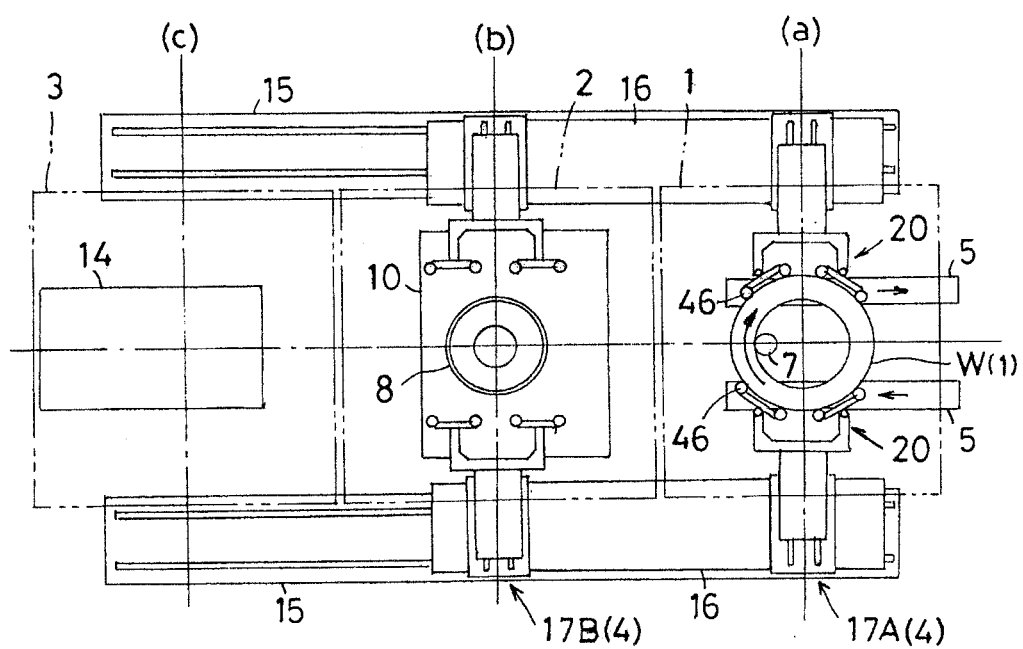
FIG. 9 is a plan view illustrating the tire conveying operation.

(4) When centering of the tire W (1) is over, the left and right carry-in conveyers 5 are rotated in opposite directions as illustrated in FIG. 9, and the tire W (1) is guided by the support rollers 46 and rotated around its own axis on the carry-in conveyers 5 in a predetermined direction. During the rotation, the free-rotating application roller 7 applies the stripping agent to the inner circumference of the bead portion of the tire W (1).

(5) By the time when the tire W (1) is rotated on its own axis for a period of time preset for one or more rotations, the stripping agent is applied to all over the inner circumference of the bead portion. Then, the carry-in conveyers 5 are stopped, and the application roller 7 is moved downward to the position down below.

(6) When the application of the stripping agent is over, the left-right movable tables 27 and 27 of the left and right tire support mechanisms 20 are driven to synchronously move again toward the conveyance path. The eight support rollers 46 of the tire grippers 28 are thereby heavily pushed against the tire W (1), and the tire W (1) is securely held not to fall off between the left and right tire support mechanisms 20. The tire gripping unit 17A thus securely holding the tire W (1) can be moved fast or suddenly stopped.

(7) The up-down tables 26 of the left and right tire support mechanisms 20 are controlled to synchronously move upward by a preset amount. Then, the left and right tire grippers 28 griping the tire W (1) coated with the stripping agent from the left and right sides thereof are synchronously moved upward to lift the tire W (1) upward from the carry-in conveyers 5.

Figure 10:
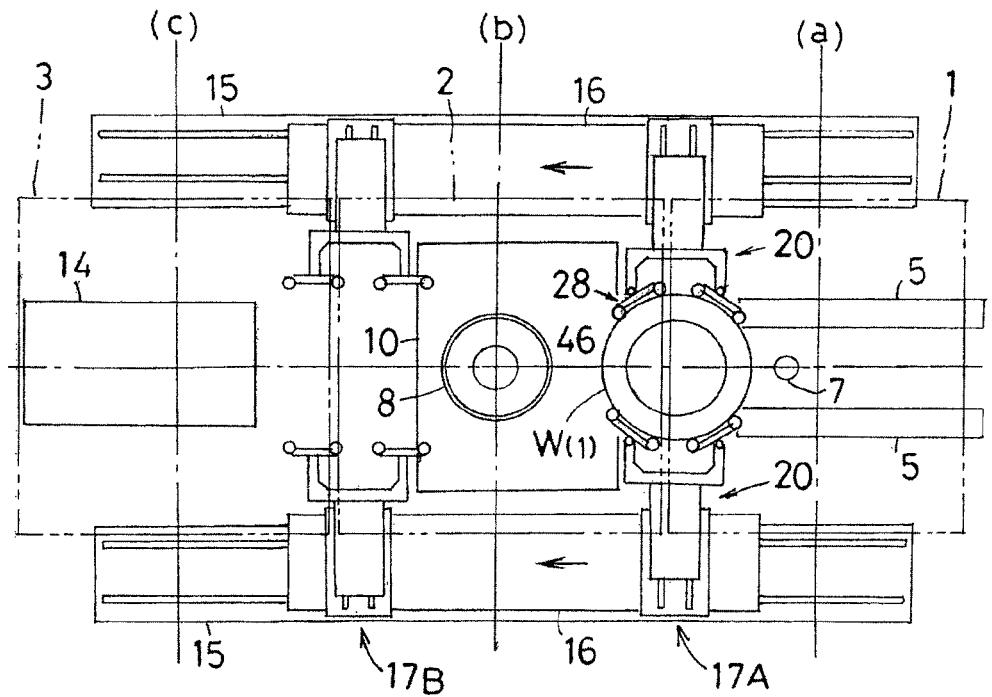
FIG. 10 is a plan view illustrating the tire conveying operation.

(8) As illustrated in FIG. 10, the left-right movable tables 1.6 are controlled to synchronously move rearward, and the tire W (1) lifted by the left and right tire grippers 28 is conveyed rearward.

The conventional devices, wherein the tires are conveyed by the roller conveyors, had the problem that the rollers often slip relative to the tires. However, when the tire W (1) is gripped by the left and right tire grippers 28 from both sides of the tire and conveyed rearward as described so far, the problem of the conventional devices is solved, and the tire W (1) can be conveyed at high speeds. Other advantages in contrast to the conventional devices wherein the tires are conveyed by the roller conveyors are; less vibration and noise, and no accidental rotation of the tire W (1) during the conveyance.

Figure 11:
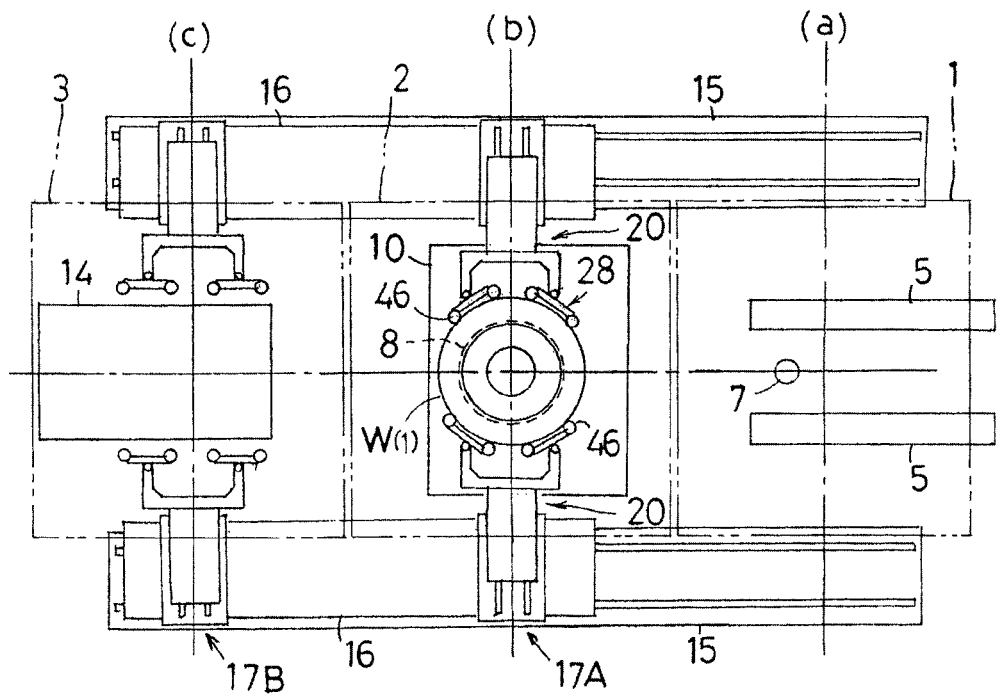
FIG. 11 is a plan view illustrating the tire conveying operation.

(9) An amount of rearward movement of the front-rear movable tables 16, that is a stroke, is set correspondingly to the interval of the center positions of the stages 1, 2, and 3. With the rearward movement of the front-rear movable tables 16 being arrested, therefore, the tire gripping unit 17A on the front side gripping the tire W (1) is located at the center position b of the measuring stage 2 as illustrated in FIG. 11.

Next, the up-down tables 26 of the left and right tire support mechanisms 20 are controlled to synchronously move downward by a preset amount, and the tire W (1) is accordingly mounted on the lower rim 8. At the time, the tire W (1) gripped by the tire gripping unit 17A is already centered. When the up-down tables 26 move downward, therefore, the tire W (1) correctly positionally adjusted is mounted on the lower rim 8. After the front-rear movable tables 16 already moved to predetermined positions rearward, the tire gripping unit 17B on the rear side is located at the center position c of the marking stage 3.

(10) Immediately after the tire W (1) is mounted on the lower rim 8, the left and right movable tables 27 of the left and right tire support mechanisms 20 are synchronously moved backward away from each other. Then, all of the support rollers 46 of the tire grippers 28 move away from the tire W (1) and return to their standby conditions, and the front-rear movable tables 16 move forward as illustrated in FIG. 12. When the front-rear movable tables 16 returned to their positions forward, the tire gripping unit 17A on the front side is located again at the center position a of the carry-in stage 1, and the tire gripping unit 17B on the rear side is located again at the center position b of the measuring stage 2 as illustrated in FIG. 13.

(11) In the measuring stage 2, the upper rim 11 is moved downward onto the tire W (1) mounted on the lower rim 8, and a coupling shaft 11a extending downward from the center of the upper rim 11 enters the spindle 9 through the center hole of the tire W (1) and connected to the spindle 9 as illustrated in FIG. 2. After that, the pressurized air is injected into the tire W (1) held between the upper rim 8 and the lower rim 11 to inflate the tire W (1) until a predetermined internal pressure is reached. The inflated tire W (1) is rotated at a predetermined speed by the spindle 9. During the rotation, a centrifugal force horizontally generated by the unbalance of the tire W (1) is measured, and the rotational position of the tire W (1) is measured. Then, the dynamic balance and minimum weight position of the tire W (1) are processed and obtained from these measured data.

Figure 14:
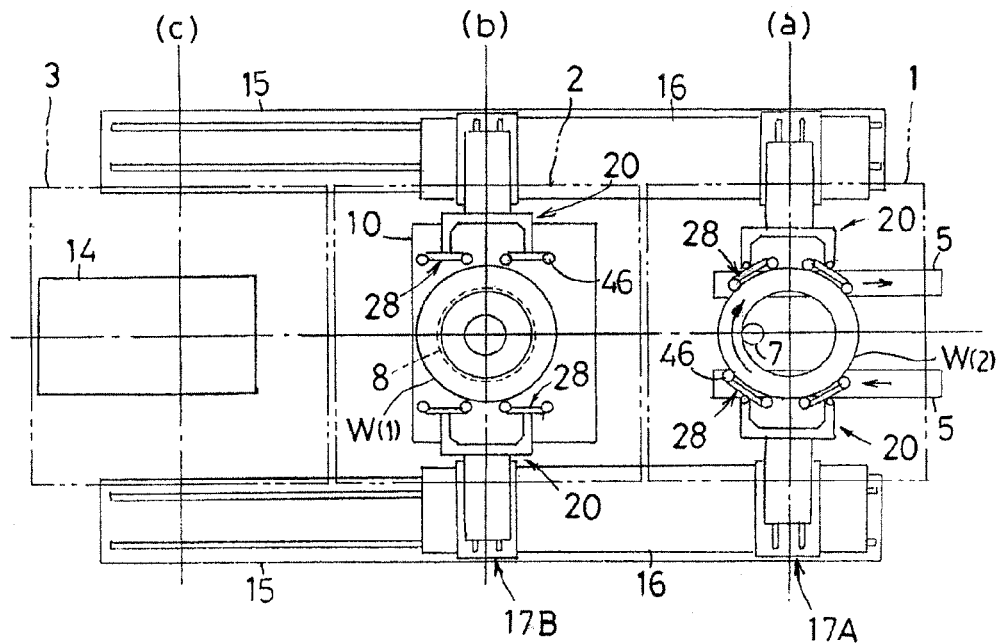
FIG. 14 is a plan view illustrating the tire conveying operation.

During the measuring processes, the operations 1) to 5) are performed in the carry-in stage 1 as illustrated in FIGS. 13 and 14. Then, a next tire W (2) is centered by the tire gripping unit 17A, and the stripping agent is applied to the tire W (2).

(12) In the measuring stage 2, when the measuring processes are over, the air is evacuated from the tire, and the upper rim 11 is moved upward away from the tire. The left-right movable tables 27 of the left and right tire gripping mechanism 20 are then controlled to synchronously move again toward the conveyance path. Then, the measuring-completed tire W (1) is firmly gripped by the left and right tire grippers 28. In the carry-in stage 1, the operations 6) and 7) are performed, and the tire W (2) coated with the stripping agent is firmly held by the left and right tire support mechanisms 20.

(13) Then, the left and right up-down tables 26 of the tire gripping unit 17B on the rear side are controlled to synchronously move upward by a preset amount. Then, the left and right tire grippers 28 gripping the measuring-completed tire W (1) from the left and right sides thereof are synchronously moved upward, and the tire W is lifted upward and removed from the lower rim 8. In the tire gripping unit 17A on the front side, the operation 7) is performed, and the tire W (2) coated with the stripping agent is lifted upward from the carry-in conveyers 5.

Figure 15:
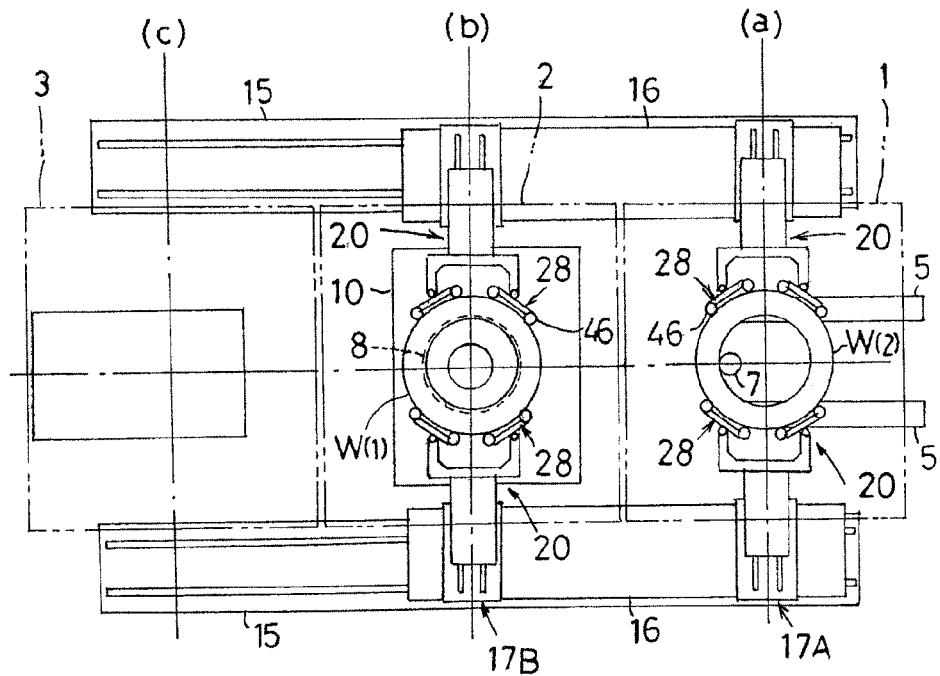
FIG. 15 is a plan view illustrating the tire conveying operation.

(14) As illustrated in FIG. 15, when the left and right front-rear movable tables 16 are synchronously moved rearward, the measuring-completed tire W (1) gripped by the tire gripping unit 17B on the rear side and the tire W (2) coated with the stripping agent and gripped by the tire gripping unit 17A on the front side are conveyed rearward together.

Figure 16:
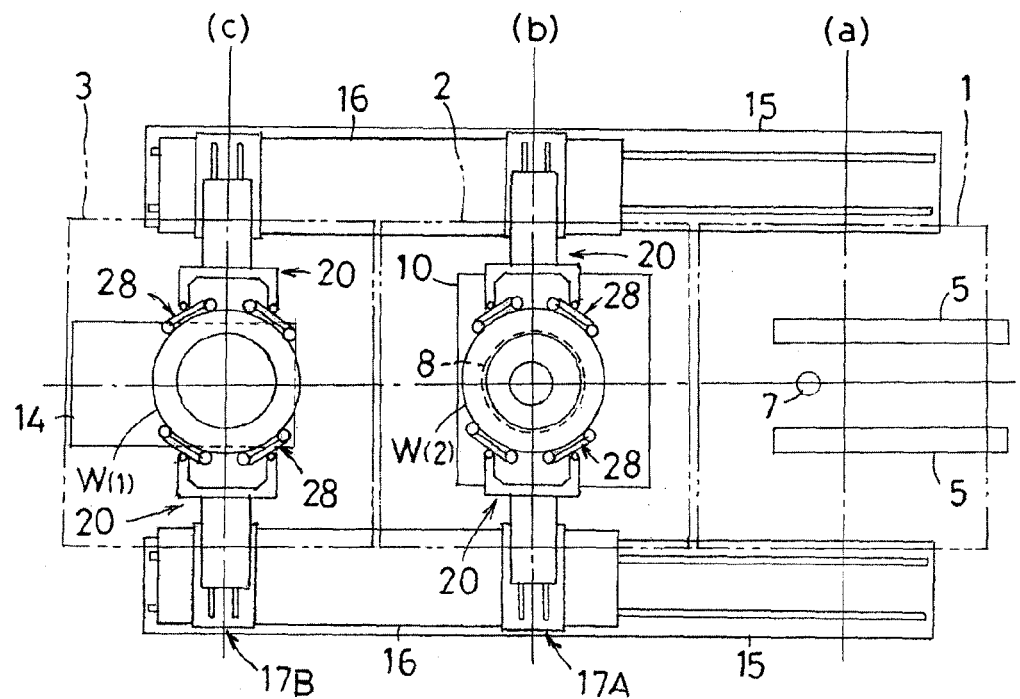
FIG. 16 is a plan view illustrating the tire conveying operation.

(15) With the rearward movements of the front-rear movable tables 16 being arrested, the tire gripping unit 17B on the rear side gripping the measuring-completed tire W (1) is located at the center position c of the marking stage 3 as illustrated in FIG. 16. When the up-down tables 26 of the left and right tire support mechanisms 20 are controlled to synchronously move downward by a preset amount, the tire W (1) is centered and placed on the carry-out conveyers 14. After that, the marking head 13*a* of the marking device 13 is moved downward to imprint a mark with a color and a shape at a predetermined position on an upper surface (side surface) of the tire W (1). Simultaneously with these processes, the operations 9) and 10) for the next tire W (2) are performed in the measuring stage 2.

Before the tire W (1) is conveyed to the marking stage 3, the rotational position of the tire W (1) is corrected while the tire W (1) is still in the measuring stage 2 so that a marking point, such as a minimum weight point measured and calculated, is located immediately below the position of the marking head 13*a* of the marking device 13.

Figure 17:
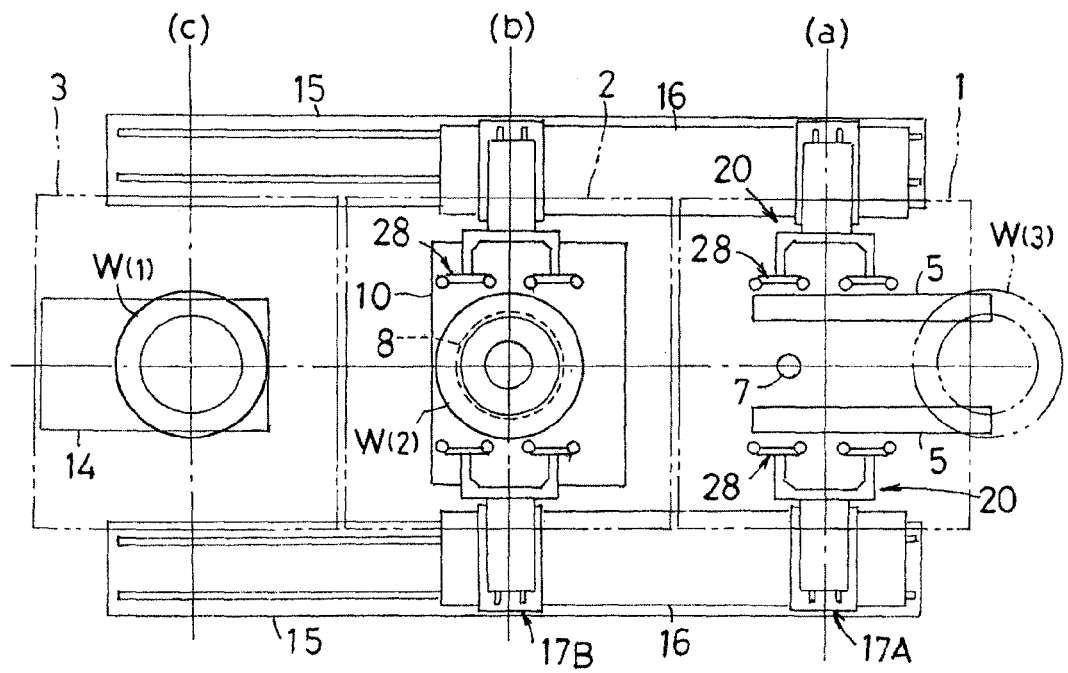
FIG. 17 is a plan view illustrating the tire conveying operation.

After the tire W (1) is placed on the carry-out conveyers 14, the left and right tire grippers 28 of the tire gripping unit 17B on the rear side move away from the tire W (1). Immediately after that, the front-rear movable tables 16 move forward to return to their positions. As a result, the tire gripping unit 17A on the front side moves to the carry-in stage 1, while the tire gripping unit 17B on the rear side moves to the measuring stage 2 as illustrated in FIG. 17.

(16) When the marking processes in the marking stage 3 are over, the marking head 13*a* moves upward to return to its standby position. Further, the carry-out conveyers 14 are turned on, and the marking-completed tire W (1) is conveyed rearward.

When the two tire gripping units 17A and 17B on the front and rear sides are thus synchronously reciprocated twice in the front-rear direction with a predetermined stroke that is a predetermined pitch, the tire W is conveyed to the carry-in stage 1, measuring stage 2, and marking stage 3 at high speeds.

Embodiment 2

Figure 18:
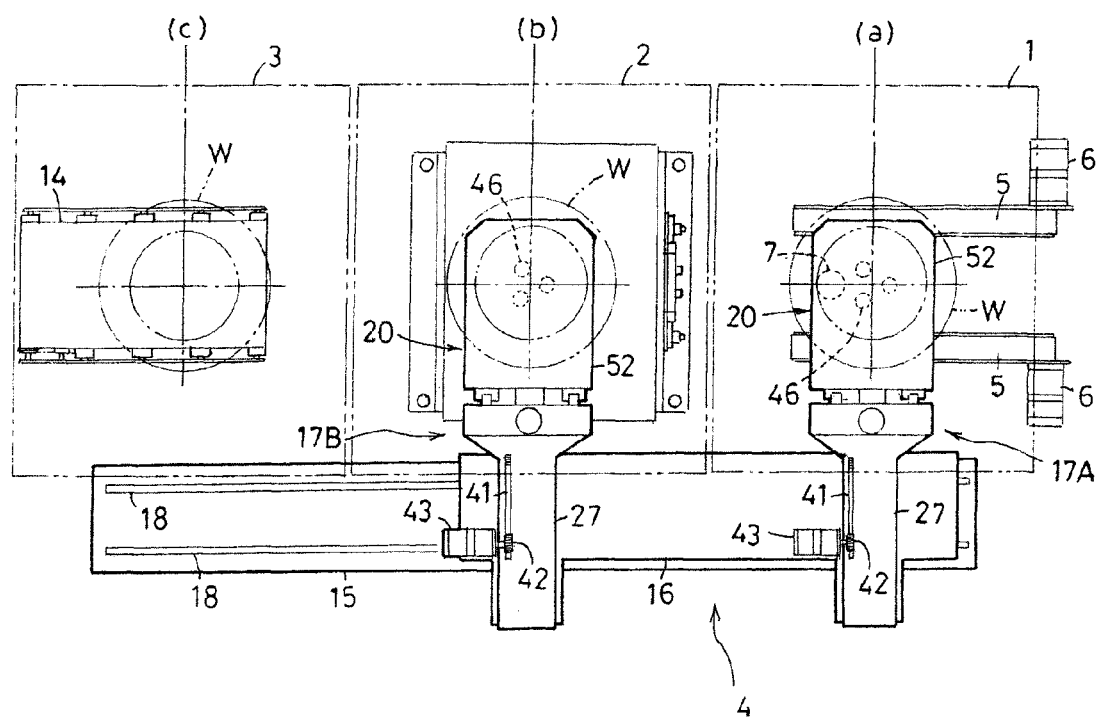
FIG. 18 is a plan view of a tire dynamic balance measuring system provided with a tire conveyance device according to another embodiment.
Figure 20:
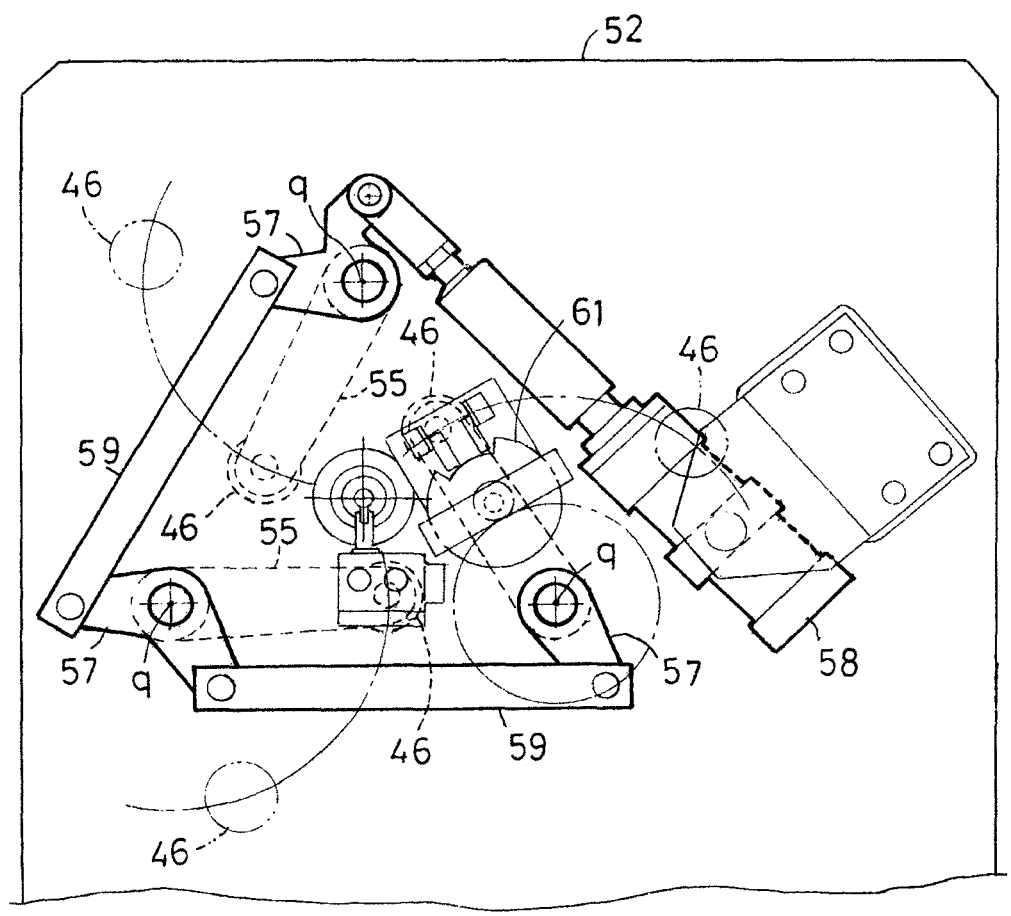
FIG. 20 is a plan view of a tire support mechanism according to the embodiment of FIG. 18.
Figure 21:
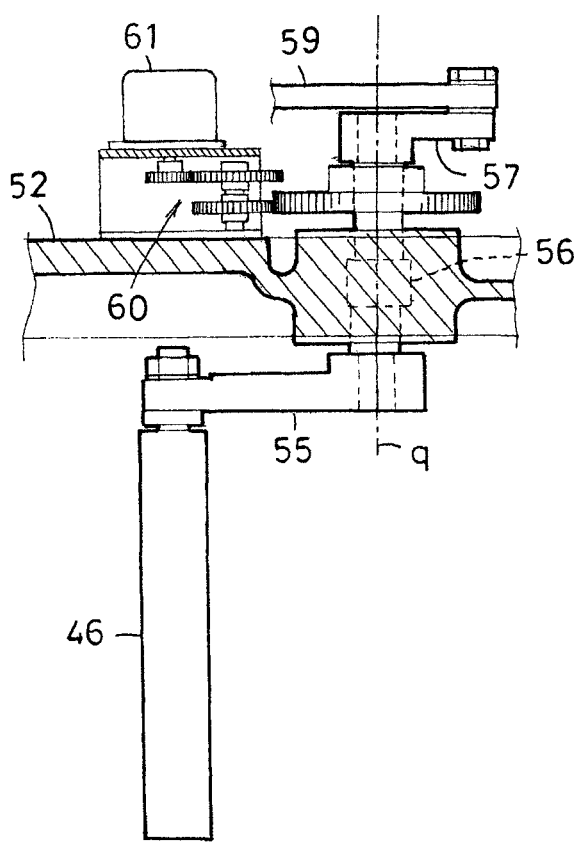
FIG. 21 is a front view of the tire support mechanism according to the embodiment of FIG. 18.

FIG. 18 is a plan view of a tire dynamic balance measuring system provided with a tire conveyance device according to an embodiment 2. FIG. 19 is a front view of the tire conveyance device. FIG. 20 is a plan view of a tire support mechanism. FIG. 21 is a front view of a main part of the tire support mechanism.

A tire conveyance device 4 according to the embodiment has a base 15 having an elongated shape in the front-rear direction. The base 15 is fixed to one side of the conveyance path provided along the front-rear direction that is a tire conveyance direction. The tire conveyance device 4 further has a front-rear movable table 16 attached to the base 15 movably in the front-rear direction, and two tire gripping units 17A and 17B provided at front and rear two positions of the front-rear movable table 16.

Similarly to the embodiment 1, a pair of left and right rails 18, which are long rails extending in the front-rear direction, is provided on an upper surface of the base 15. A front-rear movable table 16 is mounted on the rails 18 via sliders 19 movably in the front-rear direction. The mechanism of the drive structure of the front-rear movable table 16 is similar to that of the embodiment 1. Describing the drive structure referring to FIG. 19, a rack 21 with its teeth turned downward is provided on a lower surface of the front-rear movable table 16 along the front-rear direction, and a pinion gear 22 engaged with the rack 21 is pivotally connected to a center part of the base 15 in the front-rear direction. Further, a tooted belt 25 is wound around the pinion gear 22 and a servo motor 24 provided in the base 15. The pinion gear 22 and the servo motor 24 accordingly operate in an interlocking manner.

Describing the drive unit according to the embodiment, when the servo motor 24 is rotated in normal or reverse direction to rotate the pinion gear 22, the front-rear movable table 16 moves in the front-rear direction, thereby synchronously moving the two tire griping units 17A and 17B on the front and rear sides in the front-rear direction.

Similarly to the embodiment 1, the tire support mechanism 20 of each tire gripping unit 17A, 17B is provided with a left-right movable table 27 attached to the front-rear movable table 16 movably leftward and rightward via rails 39 and sliders 40, an up-down frame 52 supported movably upward and downward by an end part of the left-right movable table 27 on the conveyance-path side via vertical rails 50 and sliders 51, and a tire gripper 28 attached to an idle-end side of the up-down frame 52. The up-down frame 52 is driven in a screw-feed manner by a feed screw 54 rotated in normal and reverse directions by a servo motor 53.

The tire gripper 28 includes three support rollers 46 vertically situated. On a lower side of the up-down frame 52, the support rollers 46 are pivotally supported in a freely rotatable manner by idle ends of oscillatable arms 55 horizontally oscillatable around a fulcrum q illustrated in FIGS. 20 and 21.

A support shaft 56 of each oscillatable arm 55 penetrates through the up-down frame 52 and protrudes upward. An operating arm 57 that oscillates integrally with the oscillatable arm 55 via the support shaft 56 is connected to a protruding part in an upper end of each support shaft 56. One of the operating arms 57 is oscillated by a cylinder 58. The one of the operating arms 57 is coupled to the other operating arms 57 via linkages 59.

When the three operating arms 57 thus coupled to one another are oscillated at the same time, the three support rollers 46 are synchronously oscillated and moved inward and outward.

As illustrated in FIGS. 20 and 21, the oscillation of one of the operation arms 57 is transmitted to a rotary encoder 61 via a gear mechanism 60, and a position of the oscillating support roller 46 is detected from a position of the oscillating operating arm 57. By controlling the cylinder 58 based on the information detected by the rotary encoder 61, the positions of the support rollers 46 are controlled.

When the support rollers 46 that moved inward are all gathered near the center of the tire gripper 28, the support rollers 46 can be inserted in and pulled out of the center hole of the tire W from the upper direction by moving the up-down frame 52 upward and downward. When the support rollers 46 thus gathered and inserted in the center hole of the tire W are synchronously moved outward, the support rollers 46 can support the tire W in a manner that the inner circumference of the bead portion of the tire W is enlarged.

This positionally adjusts the tire W to the center of the tire gripper 28 (centering). When the up-down frame 52 is moved upward and downward with the support rollers 46 supportably pushing the tire W from its inner circumferential side, the tire W can be moved upward and downward.

Similarly to the embodiment 1, the tire conveyance device 4 thus characterized moves the front-rear movable table 16 in the front-rear direction with a stroke corresponding to the stage interval, thereby conveying the tire W gripped by the front, rear tire gripping unit 17A, 17B to the center positions a), b), and c) of the stages 1, 2, and 3.

Embodiment 3

Figure 22:
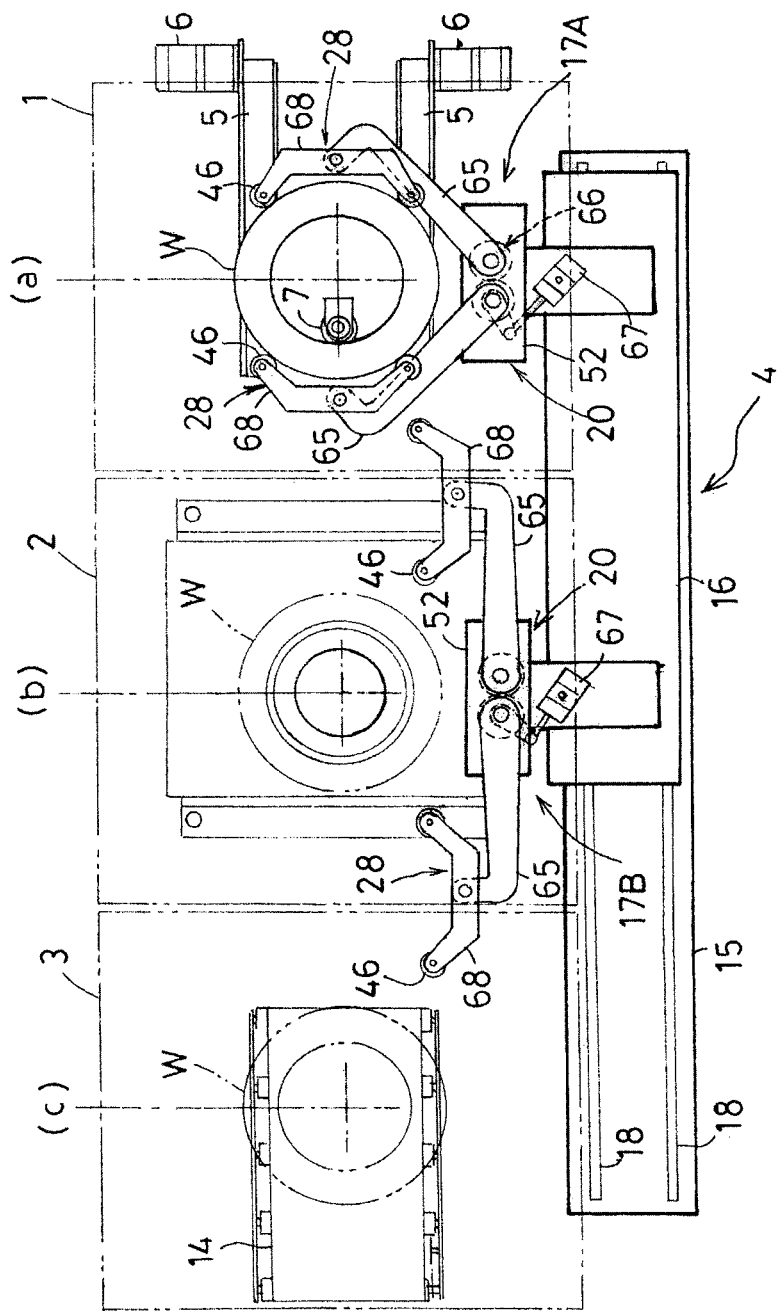
FIG. 22 is a plan view of a tire support mechanism according to yet another embodiment of the invention.

FIG. 22 illustrates a tire dynamic balance measuring system provided with a tire support conveyance device 4 according to an embodiment 3 of the invention. According to the embodiment, tire support mechanisms 20 of tire gripping units 17A and 17B each has an up-down frame 52, and tire grippers 28 attached to an idle-end side of the up-down frame 52. Though not illustrated in the drawing, the up-down frame 52 is driven in a screw-feed manner by a feed screw rotated in normal and reverse directions by a servo motor.

The up-down frame 52 has a pair of front and rear operating arms 65 horizontally oscillatable. The operating arms 65 are respectively coupled to a cylinder 67 via a reverse gear mechanism 66 in an interlocking manner. The operating arms 65 are accordingly oscillated synchronously in opposite directions. The idle ends of the operating arms 65 are respectively provided with tire grippers 28.

The tire gripper 28 has an oscillatable member 68 attached to the idle end of the operating arm 65 in a horizontally oscillatable manner, and a pair of support rollers 46 pivotally supported in a freely rotatable manner by both ends of the oscillatable member 68.

According to the embodiment thus characterized, when the operating arms 65 are oscillated toward each other, the support rollers 46 of the front and rear tire grippers 28 center the tire W while supportably pushing the tire W from its outer circumferential sides. As a result, the tire grippers 28 can grip the centered tire W. When the up-down frame 52 is moved upward, the tire W gripped by the tire grippers 28 can be lifted upward.

Similarly to the embodiment 1, the tire conveyance device 4 thus characterized moves the front-rear movable table 16 in the front-rear direction with a stroke corresponding to the stage interval, thereby conveying the tire W gripped by the front, rear tire gripping unit 17A, 17B to the center positions a), b), and c) of the stages 1, 2, and 3.

Embodiment 4

Figure 23:
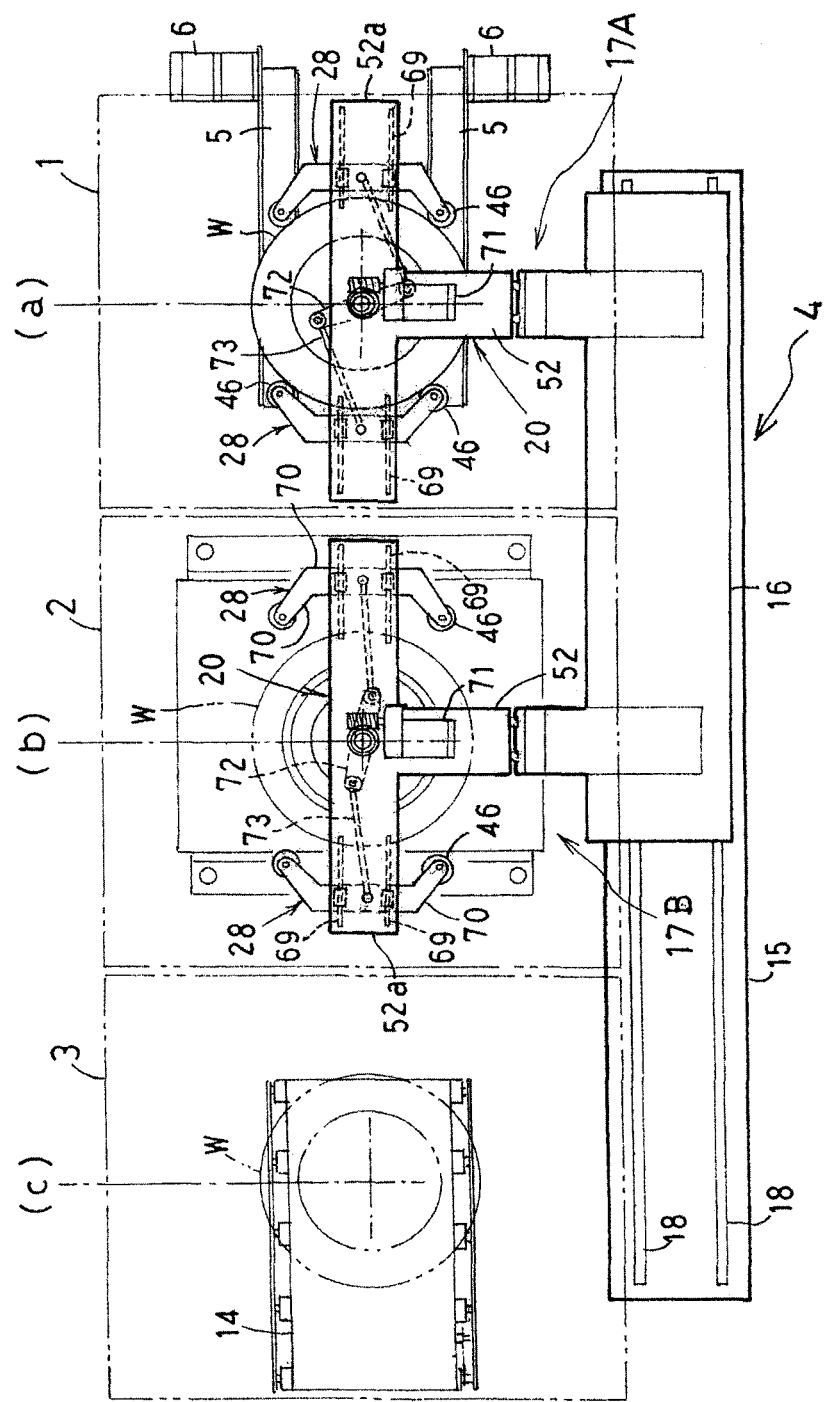
FIG. 23 is a plan view of a tire support mechanism according to yet another embodiment of the invention.

FIG. 23 illustrates a tire dynamic balance measuring system provided with a tire support conveyance device 4 according to an embodiment 4 of the invention. According to the embodiment, tire support mechanisms 20 of tire gripping units 17A and 17B each has an up-down frame 52, and tire grippers 28 attached to an idle-end side of the up-down frame 52. Though not illustrated in the drawing, the up-down frame 52 is moved upward and downward by a screw-feed driver or a cylinder.

The up-down frame 52 is provided with a support member 52a having an elongated shape in the front-rear direction. A pair of front and rear tire grippers 28 is provided on a lower side of the support member 52a. The tire gripper 28 has a pair of front and rear support members 70 movable in parallel to each other in the front-rear direction via long guiding rails 69 extending in the front-rear direction, and a pair of support rollers 46 supported in a freely rotatable manner by end parts of the left and right of the support members 70.

An operating arm 72 interlocked by a gear with a servo motor 71 is provided at the center of the support member 52a in the front-rear direction. The both ends of the operating arm 72 and the support members 70 are coupled via interlocking rods 73 so as to move in an interlocking manner.

When the operating arm 72 is oscillated in normal and reverse directions, the support members 70 move toward and away from each other in the front-rear direction.

When the support members 70 are moved in parallel toward to each other, the support rollers 46 of the front and rear tire grippers 28 facing each other pushes the tire W from its outer circumference, thereby supporting the tire W. As a result, the tire W can be centered and gripped at the same time. When the up-down frame 52 is moved upward with the tire W being held in this manner, the tire W can be lifted upward.

Similarly to the embodiment 1, the tire conveyance device 4 thus characterized moves the front-rear movable table 16 in the front-rear direction with a stroke corresponding to the stage interval, thereby conveying the tire W gripped by the front, rear tire gripping unit 17A, 17B to the center positions a), b), and c) of the stages 1, 2, and 3.

Modified Embodiment

A modified embodiment of the invention is hereinafter described.

(1) The structure of the tire grippers 28 may be simplified; the tire W is gripped by four support rollers 46 in total provided at edges of the bifurcated support arms 44.

(2) Preferably, the support rollers 46 that sandwich the tire W therebetween from the left and right sides to hold the tire W each has a non-slip surface to prevent the tire W thereby held from falling off when lifted upward. Preferable examples of the non-slip surface are; roughened surface with satin finish, surface with a large number of fine dents and projections, and surface with a large number of annular grooves and protrusive streaks.

(3) A possible structure for synchronously moving the front and rear tire gripping units 17A and 17B in the front-rear direction is; a front-rear movable table 16 movable along rails 18 is coupled to an endless chain or belt driven in normal and reverse directions, and stoppers facing each other at front and rear ends of the front-rear movable table 16 are provided on the base 15. According to this structure, positions where the movements of the tire griping units 17A and 17B are arrested are controlled by making the gripping units 17A and 171 contact the stoppers.

(4) A possible structure for moving the left-right movable table 27 in the left-right direction; a feed screw is driven by a servo motor in normal and reverse directions to move the left-right movable table 27 in a screw-feed manner.

(5) In the embodiments described so far, the invention is applied to a tire dynamic balance measuring system for testing the dynamic balance of tires. However, the invention is not necessarily limited to such tire dynamic balance measuring systems but is also applicable to tire conveyance mechanisms for, for example, tire production lines.

According to the invention, two tire gripping units are provided. However, there may be three or more tire gripping units, in which case three more tire gripping units are preferably moved together in the conveyance direction with a stroke equal to an interval of four or more processing stages equally spaced from one another.

The invention claimed is:

1. A tire conveyance device arranged among at least three stages and positioned at equal intervals among the stages in a conveying direction for a tire, the at least three stages including in order along the conveying direction a first stage configured to carry-in a tire having a horizontal posture, a second stage configured for dynamic balance measurement of the tire, and a third stage configured for marking the tire, the tire conveyance device comprising:
   a plurality of tire gripping means for gripping the tire while in said horizontal posture;
   driving means for moving the plurality of tire gripping means; and
   a movement path of the tire parallel to said conveying direction;
   wherein the plurality of tire gripping means are disposed at said equal intervals along the conveying direction of the tire;
   wherein the driving means has a movable table that moves in the conveying direction along the movement path of the tire;
   wherein the plurality of tire gripping means are mounted on the movable table;
   wherein the plurality of tire gripping means grip the tire from an outer circumferential side or an inner circumferential side of the tire; and
   wherein the driving means is configured to move synchronously the plurality of tire gripping means along the conveying direction thereby to convey the tire from an upstream side to a downstream side of the conveying direction.

2. The tire conveyance device according to claim 1,
   wherein the movement path of the tire is arranged on both sides of the conveyance path of the tire;
   wherein the movable table is arranged on one side of the movement path and an other side of the movement path; respectively of the plurality of tire gripping means, a tire gripping means of one side of the movable table, and a tire gripping means of another side of the movable table have a pair of tire support mechanisms opposing each other; and
   wherein the pair of tire support mechanisms are disposed on the movable table.

3. The tire conveyance device according to claim 1,
   wherein the movement path is arranged on one side of the conveyance path of the tire;
   wherein the movable table is arranged along the movement path;
   wherein the plurality of tire gripping means each have a tire support mechanism;
   wherein each of the tire support mechanisms is adjacent to each other along the conveying path; and
   wherein each of the tire support mechanisms is disposed on the movable table.

4. The tire conveyance device according to claim 2,
   wherein each of the pair of the tire support mechanisms has a tire gripping portion opposing each other;
   wherein the tire gripping portions are composed so as to be movable close to and away from each other and to be elevatable; and
   wherein the tire gripping portions move in the direction approaching each other and nip the outer circumferential side of the tire from both sides thereof thereby to grip the tire.

5. The tire conveyance device according to claim 3,
   wherein the tire support mechanisms each has a pair of tire gripping portions adjacent to each other along the conveying direction;
   wherein the pair of tire gripping portions are horizontally oscillatable close to and away from each other and are elevatable; and
   wherein the pair of tire gripping portions oscillate in the direction approaching each other and nip the outer circumferential side of the tire thereby to grip the tire.

6. The tire conveyance device according to claim 3,
   wherein the tire support mechanisms have a tire gripping portion adjacent to each other along the conveying direction;
   wherein the pair of tire gripping portions have a plurality of support bodies movable inward and outward, and are composed so as to be elevatable relative to the tire from an upper side of the tire; and
   wherein the plurality of support bodies are inserted into a hole of the tire, moved outward, and expand the inner circumferential side of the tire thereby to grip the tire.

7. The tire conveyance device according claim 1,
   wherein the stage for carrying-in the tire has a pair of carrying-in conveyers; and
   wherein the pair of carrying-in conveyers are being synchronously driven to the same direction to each other thereby to convey the tire and are driven in the opposite direction to each other thereby to rotate the tire around its own axis.

* * * * *